United States Patent Office 3,550,427
Patented Dec. 29, 1970

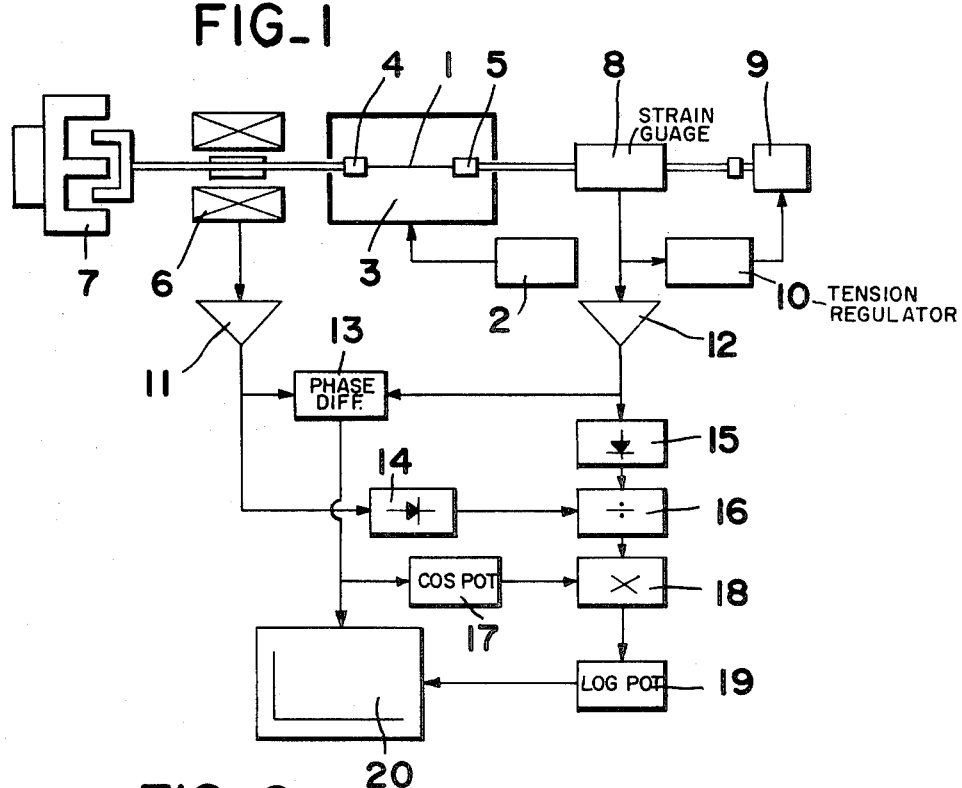
FIG_1
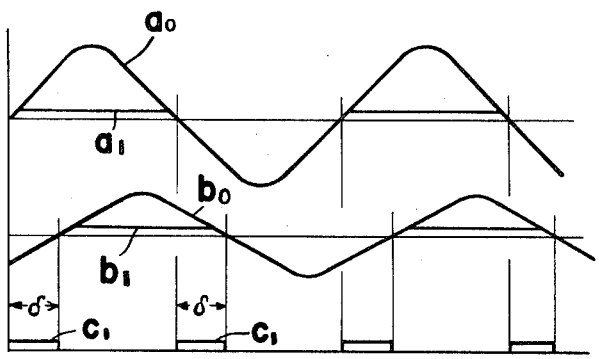
FIG_2

3,550,427
AUTOMATIC CONTINUOUS DYNAMIC MODULUS DETERMINING APPARATUS
Jungo Sueyoshi, Kurashiki, Japan, assignor to Kurashiki Rayon Co., Ltd., Kurashiki, Japan
Filed Oct. 10, 1968, Ser. No. 766,470
Claims priority, application Japan, Oct. 28, 1967, 42/91,598
Int. Cl. G01n 3/32
U.S. Cl. 73—15.6                                 1 Claim

ABSTRACT OF THE DISCLOSURE

This invention provides a dynamic modulus determining apparatus adapted to record in an XY recorder dynamic modulus variation of a test piece made of high polymers and the like dependent upon successive temperature changes of the test piece. The apparatus is characterized by tensioning means for maintaining the tension of the test piece at a proper value sufficient to transmit the oscillating stress to a strain gauge, a phase difference measuring means for measuring the phase difference between output potentials derived from a differential transformer and the strain gauge, respectively, and means for compressing a potential proportional to the dynamic modulus of the test piece.

---

This invention relates to a determining apparatus of dynamic modulus of high polymers and the like.

Reference is provided in respect of a method for the determination of dynamic modulus in the U.S. patent specification No. 3,132,509, patented May 12, 1964, of which a prime feature is characterized in that both ends of an elongated piece of the test material consisting of a high polymer are supported to expand in the opposite direction from each other, and that one end thereof is subjected to oscillation. Detection of the oscillation takes place at two points thereof whereby a phase difference of a wave form due to the oscillation therebetween is determined. However, in order to determine the phase difference in a manner described above, output potentials from the first and second strain gauges must be respectively amplified until magnitudes of said strain gauges become equal each other so that it requires a manual manipulation to adjust gains of amplifiers, resulting in an impossibility of automatically continuous determination of the dynamic modulus. Therefore, the method in accordance with the invention patented as the U.S. Pat. No. 3,132,509 does not provide an apparatus to continuously measure dynamic modulus variations generated by a successive change of temperature subjected to the test material.

Upon improving this method hereinbefore described, this invention provides a novel apparatus for automatically and continuously recording in an XY recorder the dynamic modulus variations caused by a successive change of temperature subjected to a sample material, by providing (a) tension adjustment to impart a tension proportional to the oscillation stress to which the test material is subjected in order to avoid the material from straining caused by a raise of the temperature, (b) that by providing the Schmitt trigger circuit, NOR circuit, and AND circuit in a phase difference determining section in such a way as to adjust gains of amplifiers for a differential transformer and a strain gauge so as to remove the manual manipulation of the amplifiers, and (c) that the real number in a complex number of the dynamic modulus rate running into a plurality of numeral figures is recorded in a logarithmically compressed paper-record.

This invention will be hereinafter described in details with reference to the accompanying drawings, in which:

FIG. 1 is a circuit diagram showing the structure of an automatic continuous dynamic modulus determining apparatus in accordance with this invention; and FIG. 2 is a schematic diagram showing wave forms for explaining the operation of the phase difference measure.

Referring now to the FIG. 1, a piece of the test material 1 made of a high polymer is fixed between terminals 4 and 5 in an experiment furnace 3 whose inside temperature can be raised by means of a programming unit 2. The terminal 4 is connected through a differential transformer 6 to an oscillating unit 7 while the terimnal 5 is connected through a strain gauge 8 to a servo-motor 9. The servo-motor 9 is provided to prevent the material 1 from straining caused by a raise in the inside temperature of the furnace 3 and is operated automatically from a tension regulating unit 10 in a manner to impart a tension proportional to the oscillation stress to the material 1. Output potentials from the differential transformer 6 and the strain gauge 8 are amplified by amplifiers 11 and 12, respectively, up to a magnitude sufficient to operate a phase difference measuring means 13 including the Schmitt trigger circuit, NOR circuit, and AND circuit. These amplified output potentials are applied to both input terminals of the phase difference measuring means 13.

Referring now to FIG. 2 in which differentiation of the phase difference measuring means 13 is shown, $a_0$ designates a wave form generated by amplification of the output potential from the differential transformer 6 while $b_0$ designates a wave form generated by amplification of the output potential from the strain gauge 8. When the both waves $a_0$ and $b_0$ are transmitted to the Schmitt trigger circuit and reshaped therein square waves as represented by $a_1$ and $b_1$ are formed. These square waves $a_1$ and $b_1$ are then transmitted to the NOR circuit and the AND circuit to generate a pulse signal as represented by $c_1$. Determination of the mean value of pulse width of the pulse signal $c_1$ renders it possible to determine a phase difference $\delta$ between the waves $a_0$ and $b_0$. According to this method, this phase difference $\delta$ can be determined without any dependence upon the voltage level of the both waves $a_0$ and $b_0$.

The output potentials generated from the differential transformer 6 and the strain gauge 8 are amplified by the amplifiers 11 and 12 respectively up to a magnitude sufficient to operate the phase difference measuring means 13 and then rectified in rectifiers 14 and 15, respectively. These rectified output potentials are transmitted to a divider 16 wherein the output potential from the rectifier 14 operates to divide the output potential from the rectifier 15 to generate an output potential proportional to the dynamic modulus of the test materal 1 as represented by the following formula;

$$\sqrt{E'^2 + E''^2}$$

where $E'$ is a real number while $E''$ is an imaginary number included in a complex number of the dynamic modulus.

The output potential proportional to the phase difference $\delta$ determined by the phase difference measuring means 13 is transmitted to a cosine function potentiometer 17 where an output potential proportional to cosine $\delta$ is generated. This output potential proportional to cosine $\delta$ and the output potential proportional to the dynamic modulus $$\sqrt{E'^2 + E''^2}$$

determined by the divider 16 are transmitted to a multiplier 18 where these two output potentials are multiplied together to produce a potential as represented by the following formula, that is, a potential proportional to E′;

$$\sqrt{E'^2+E''^2} \cdot \text{cosine } \delta$$

This potential proportional to E′ is logarithmically compressed by a logarithmic function potentiometer 19.

The potential proportional to E′ and logarithmically compressed at the logarithmic function potentiometer 19 is transmitted to an XY recorder 20, while the temperature inside the experiment furnace 3 is also transmitted to the XY recorder 20.

What is claimed is:

1. An automatic continuous dynamic modulus determining apparatus comprising an experiment furnace capable of changing its inside temperature in which both ends of an elongated piece of a test material made of a high polymer are fixed between two terminals, a differential transformer connected to one of the two terminals, an oscillating unit connected to the movable part of the differential transformer, a strain gauge connected to the other terminal, a servo-motor connected to the strain gauge, a tension controller connected between the strain gauge and the servo-motor and imparting a tension proportional to an oscillation stress on the test material, a phase difference measuring means connected between the outputs of the differential transformer and the strain gauge, a cosine function potentiometer connected to the output of the phase difference measuring means, means connected to the outputs of the differential transformer and strain gauge for providing output potentials representative of the magnitudes of outputs of the differential transformer and strain gauge prior to inputting the latter outputs to a divider which divides the output potential from the strain gauge by the output potential from the differential transformer, a multiplier connected to the output of the cosine function potentiometer and the output of the divider and multiplying the output potential from the cosine function potentiometer and the output potential from the divider, a logarithmic function potentiometer connected to the output of the multiplier and adapted to logarithmically compress the output potential produced from the multiplier, and an XY recorder connected to the output of the phase difference measuring means and the output of the multiplier and adapted to record on a record paper dynamic modulus variation dependent upon change of the temperature inside the experiment furnace.

References Cited

UNITED STATES PATENTS 3,132,509  3/1964  Hayashi _____ 73—67.1

JAMES J. GILL, Primary Examiner

H. GOLDSTEIN, Assistant Examiner

U.S. Cl. X.R.

73—67.1